R. S. SCOTT.
HOUSEHOLD INCINERATOR.
APPLICATION FILED FEB. 26, 1916. RENEWED DEC. 1, 1920.

1,364,456.

Patented Jan. 4, 1921.
3 SHEETS—SHEET 1.

Inventor
Rossiter S. Scott
By W. Schoenborn
Attorney

R. S. SCOTT.
HOUSEHOLD INCINERATOR.
APPLICATION FILED FEB. 26, 1916. RENEWED DEC. 1, 1920.
1,364,456. Patented Jan. 4, 1921.
3 SHEETS—SHEET 2.
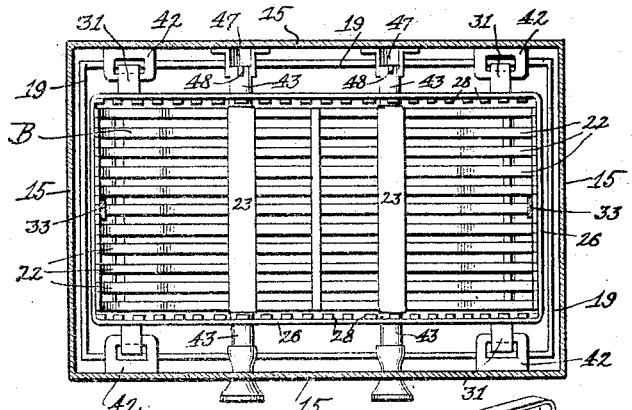
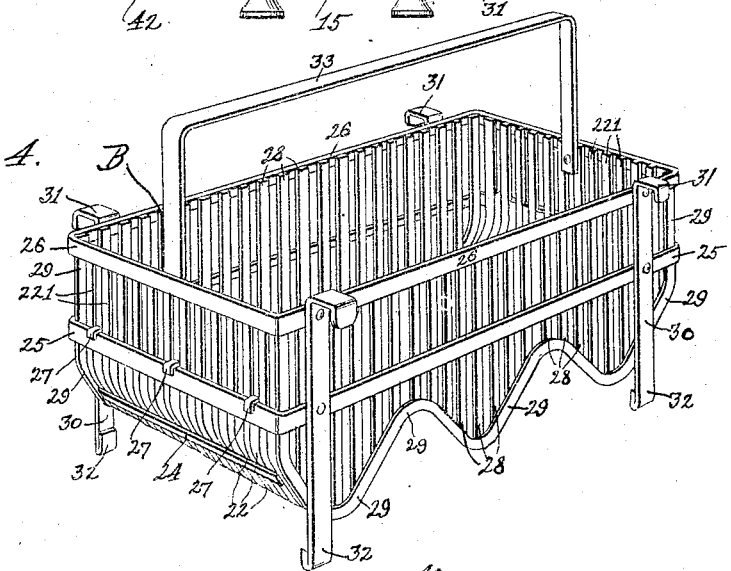
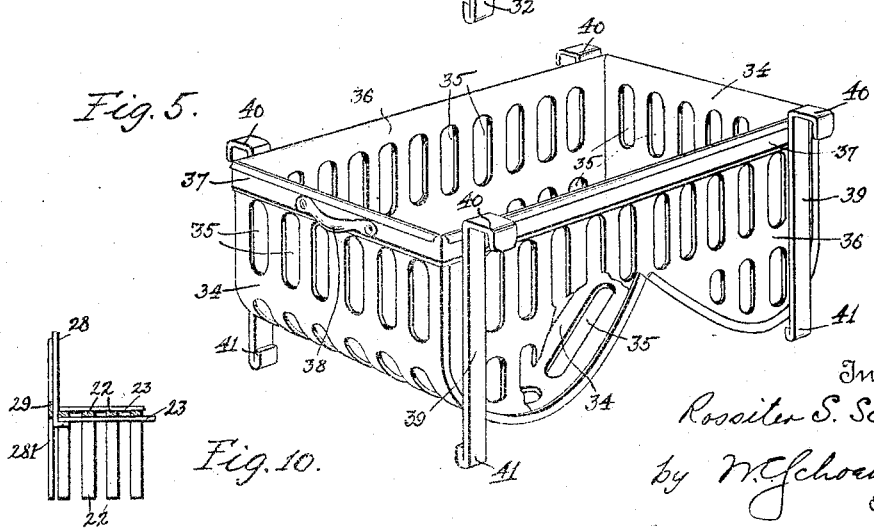

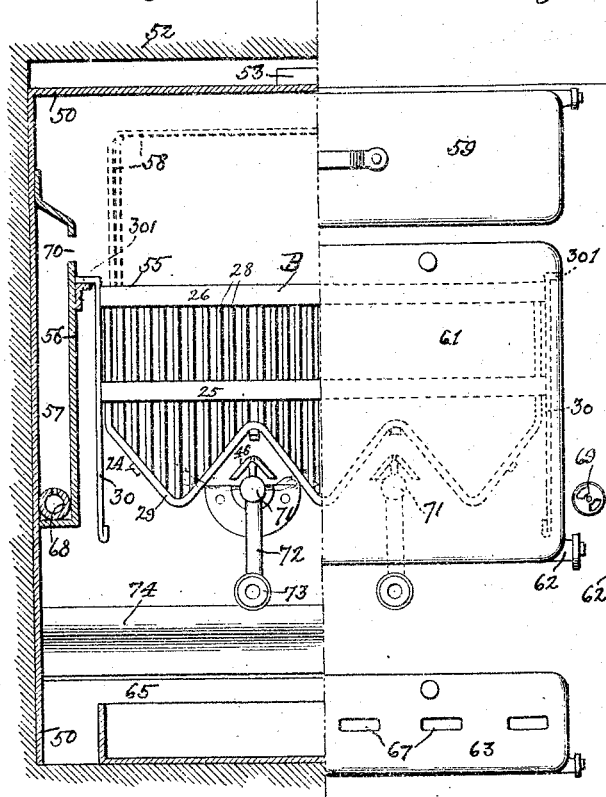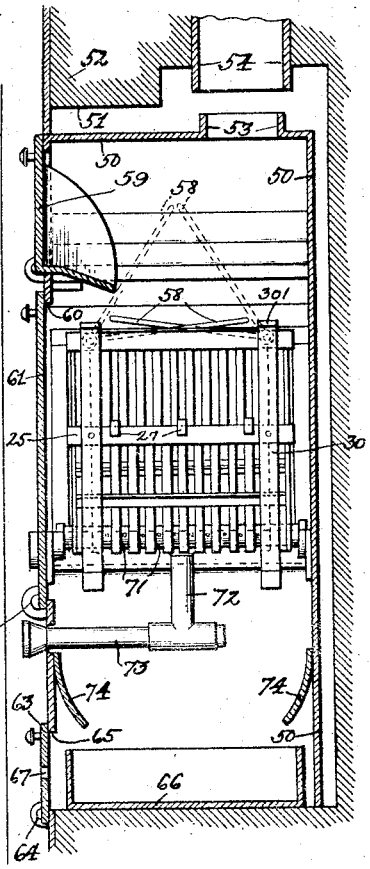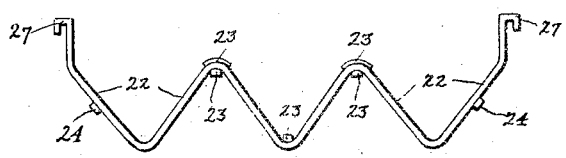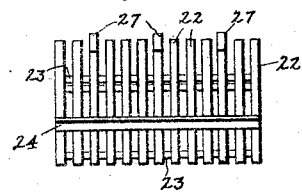

UNITED STATES PATENT OFFICE.

ROSSITER S. SCOTT, OF BALTIMORE, MARYLAND.

HOUSEHOLD INCINERATOR.

1,364,456.  Specification of Letters Patent.  Patented Jan. 4, 1921.

Application filed February 26, 1916, Serial No. 80,624. Renewed December 1, 1920. Serial No. 427,654.

*To all whom it may concern:*

Be it known that I, ROSSITER S. SCOTT, a citizen of the United States, residing at Baltimore, in the State of Maryland, have invented certain new and useful Improvements in Household Incinerators, of which the following is a specification.

This invention relates to incinerators for destroying refuse, such as garbage and the like; my object primarily being to provide an incinerator of simple, inexpensive and efficient construction adapted more especially for household use.

My invention, stated generally, comprehends an incinerator comprising a combustion chamber and a separable refuse-receptacle associated therewith, the construction and coöperative relation of the elements being such that when the receptacle is applied to said chamber the contents of the receptacle are subjected to the efficient destructive action of the heat and products of combustion. In its preferred form the refuse receptacle comprises a perforated, reticulated, or skeleton-like metallic structure of such character that it serves as a holder and drainer for the refuse; and that when it is applied to the combustion chamber the refuse is distributed and supported thereby in such a manner as to expose the contained substance to the destructive action of the heat. The form and capacity of the receptacle are such that the contents of the receptacle are readily susceptible to the destructive action of the heat within the combustion chamber. The receptacle itself performs the function of a grate for said chamber, thus dispensing with the dumping grates, and the operating mechanism therefor, heretofore employed in incinerating apparatus for the removal of ash deposit, unconsumed garbage, etc. The bottom of the receptacle preferably constitutes the grate, which bottom, in one aspect of my invention, is shown detachably secured to the body of the receptacle so as to be renewable as occasion may require.

In its preferred form the structure constituting the combustion chamber is of such a character that the refuse receptacle can be readily applied to and supported within the chamber in close relation to the heating element thereof and in spaced relation to the walls of the chamber, whereby the maximum efficiency of the heat units on the contents of the receptacle is insured.

Accordingly my invention comprehends the characteristic features above mentioned, and also various other structural and organized elements coöperating therewith; all of which will be hereinafter fully described and the scope of the invention then be defined in the appended claims.

In the drawings—

Fig. 3 is a horizontal sectional view taken on the line III—III of Fig. 1.

Fig. 4 is a perspective of the form of refuse receptacle shown in the preceding figures.

Fig. 5 is a perspective view of another form of refuse receptacle embodying my invention.

Fig. 6 is a view, partly in section, showing another form of incinerator embodying my invention.

Fig. 7 is a transverse vertical section as on the line VII—VII of Fig. 6, parts being shown in elevation.

Figs. 8 and 9 are, respectively, side and end views of the removable bottom portion of the refuse receptacle.

Fig. 10 is a detail view of the manner of supporting the removable bottom of the receptacle.

Figure 1:
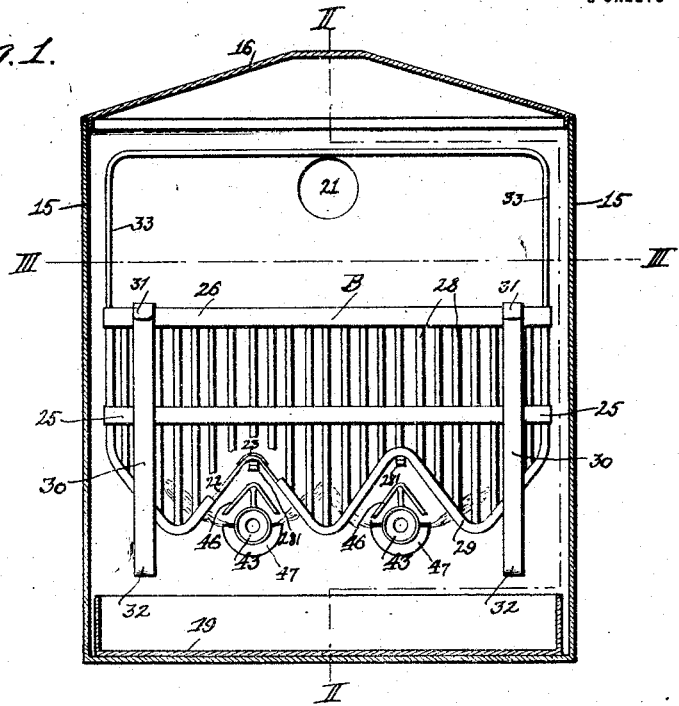
Figure 1 is a vertical longitudinal sectional view of an incinerator embodying a good form of my invention.

Referring to Figs. 1 to 4 in particular, 15 designates a metal casing, rectangular in section though it may be of any preferred design. The interior of the casing constitutes a combustion chamber. At the top of the casing 15 is provided a hinged cover 16, and in the front wall there are two openings 17 through which Bunsen gas burners enter the casing, and a bottom opening 18 through which the ash and drip pan 19 may be removed and inserted. The door 20 has an opening 201 therein which serves as an air inlet. The size of the opening 201 may be varied, as in ash pit doors of furnaces, for example. The opening 18 is closed by a door 20. The rear wall of the casing 15 has an outlet 21 which may be connected with a chimney flue to lead off the gases generated in the combustion chamber during the incineration of the garbage.

The opening in the top of the casing is large enough so that the garbage receptacle B, can be readily inserted into and removed from the combustion chamber. The garbage basket receptacle B is made of metal and is in the form of an open work basket so as to also perform the double function of a strainer for the passage of juices and a grate for the escape of ashes. The bottom of said basket B is readily removable and as shown in Figs. 8 and 9, is formed continuous with portions at the opposite ends of the basket and consists of a plurality of parallel spaced metal strips 22 which are bent intermediate their ends into wave form so as to provide arches or reëntrant portions in the under side of the bottom and pockets in the basket on opposite sides of the arched portions. The strips 22 are joined together by transversely extending strips 23 secured to the strips 22 at the bends therein. The strips 22 are also joined together at the upwardly extending ends of the sides by transversely extending strips 24 secured to the strips 22. Strengthening bands 25 and 26 extend around the outside of the body of the basket at the middle and top edge respectively. The end strips 221 are spaced apart and secured at their upper ends to the band 26 and at their lower ends to the band 25.

Referring to Figs. 4, 8 and 9, it will be seen that certain of the bottom strips 22 have hooks 27 at their ends which are arranged to hook over the upper edge of the band 25 at opposite ends of the basket, the hooks fitting in spaces between the strips 221 of the body of the basket. In this way the bottom, in case it becomes burned out, may be readily detached from the body of the basket and replaced by a new bottom, as the hooks 27 at the ends may be readily sprung into place, firmly holding the bottom in proper position. The bottom being free at its ends and having bends intermediate thereof, may expand longitudinally as the temperature rises.

The sides of the basket are made of spaced metal strips 28 secured at their upper ends to the band 26 and also secured to the band 25. The strips 28 are cut so that their lower ends lie on a curve conforming to the curvature of the bottom of the basket, and these lower ends are secured to side plates 29 which are shaped like the removable bottom of the basket and secured to the bands 25 and 26. Pairs of plates 30 are secured on opposite sides of the basket to the bands 25 and 26, and are bent at the upper ends to form outwardly facing hooks 31 and at the lower end to form feet 32. The feet 32 are located below the bottom of the basket so that the latter will be held apart from a support on which the basket stands to drain the juicy contents thereof. The basket is also provided with a suitable handle 33, by which it may be lifted, carried, or properly adjusted into its operative position in the combustion chamber of the incinerator.

Referring to Figs. 1 and 10, it will be seen that the bottom of the basket is supported at the tops of the middle loops or arches by the lower inturned end 281 of the side strip 28 opposite it. The inturned ends 281 (see Fig. 10) engage under the strips 23 at the top of the arch and strengthen the arch and support the removable bottom intermediate its ends.

In making the basket I find that the parts can be very economically secured together by spot welding them, but of course any suitable or approved method of uniting the parts or making the basket may be employed. A very satisfactory strong and light basket may be made of round wire spot welded. Such a construction is preferable because owing to its skeleton-like form it has the advantage that the juices more readily drain from the garbage and there is greater direct heat contact with the garbage or refuse and it is also cleaner and more sanitary.

The basket may also be formed of castings or made out of stamped sheet metal. In Fig. 5, I have illustrated a basket of the latter type; the bottom 34 being made of sheet metal with the openings 35 stamped therein. In this form I have shown only one inwardly bent arch portion in the bottom but any number of arches and pockets can of course be provided, openings being stamped in the sides of the arches. The sides 36 are made of plates with openings 35 stamped therein and the lower edge thereof is shaped to conform to the curvature of the bottom. The bottom 34 and sides 36 are secured together at their edges and a band 37 extends around the upper edge of the basket. Handles 38 are secured to the ends of the basket and plates 39 provided with hooks 40 and feet 41 are secured to the basket as in the form shown in Fig. 4.

The basket containing the refuse or garbage is suspended in the casing 15 by means of the hooks 31 which engage in openings in the plates 42 secured to the opposite sides of the inner wall of the casing. When the basket is properly positioned in the casing, the arched portions thereof extend over and opposite the burner pipes 43 which extend longitudinally of the arched portions. The burner pipes 43 are provided with connections 44 which extend through the openings 17 in the wall of the casing. The burner pipes 43 are provided with rows of outlets 45 for fuel, and these outlets are located on opposite sides of the burner pipes, and since the burner pipes are located in the space formed by the arches in the bottom, the outlets 45 will be located so as to cause the heat and flame therefrom to enter the basket through its removable perforated or open spaced bottom section at the proper angle, as shown for example in Figs. 1 and 6. Solid protective hoods 46 are removably arranged over the tops of the burners 43, so that the juices will run off without clogging the burner openings 45. However, should the burners become clogged through fumes or evaporation of the juices or otherwise, the burners are detachable so they may be easily removed for cleaning. Supports 47, opposite the openings 17 carry the inner ends of the burners 43, and lugs 48 are provided on the upper sides of the inner ends of said burners to show when the burners are properly positioned with their outlets 45, facing the bottom of the baskets. Thus, all the interior parts of the incinerator are removable and the interior of the incinerator box is accessible for repairing, repainting or cleaning, and the parts being detachable may be easily replaced after being worn out through long usage.

The location of the burners with respect to the basket allows access of the flames to the garbage, and combustion products and heated air may by this construction travel through and around the garbage, as ample open combustion and circulating space is allowed. The shape of the bottom of the basket is such that the garbage falls into the pockets or hoppers and toward the flames of the burners, the flame burning away the garbage so that more garbage continues to fall into the space or hoppers formerly occupied by unconsumed garbage and into the heat zone of the burners. The hot air and products of combustion passing up through the openings in the basket and through and around the garbage completely dries out the wettest kind of material. The garbage material shrinks in parting with its juices and voids are left between particles of garbage through which the generated heat more readily passes. Juices falling into the ash pan from wet garbage are evaporated and carried up the flue so that all that remains in the ash pan is practically clean ash.

The shape of the basket receptacle is such that the garbage will not become too tightly packed, and at the same time the bottom of the basket is of such shape that it allows the free circulation of heated air and the products of combustion from the burners. The shape of the basket also allows a passage for the products of combustion from the burners to the flue, should they momentarily or at any time not be able to find a passage through the garbage to the flue. The wave shape of the grate bottom also provides expansion loops so that the excessive strains caused by the wide ranges of temperature will be taken up by these loops, thus prolonging the life of the basket. This form of bottom also gives a greater area to the bottom than could be obtained with a flat-bottom basket, and consequently more heat can be distributed in and under the bottom of the basket and be available to pass through the garbage and dry it out than by using a flat bottom basket. One may also get a good direct contact of flame to the garbage by using the pocket or hopper form of construction of incinerator basket.

In Figs. 6 and 7 I have illustrated a wall type incinerator embodying my invention. The metal casing 50 is set in a recess 51 in the wall 52 and the casing has an outlet opening 53 disposed opposite the flue 54 in the wall to lead off the products of combustion, gases, odors, etc. The basket used in this form of incinerator is similar to the baskets already described, the one shown in place being similar to the one shown in Fig. 4, except that there are no hooks on the upper ends of the side members 30. The members 30 are simply turned outwardly as at 301, whereby the basket is suspended from ledges 55 at the upper end of a wall 56 which forms one side of an air inlet passage 57. Furthermore, the bails or handles 58 are pivoted to the basket, being folded down when the basket is in place, as shown in Fig. 7.

The front wall of the casing 50 is provided with a hinged hopper door 59 through which garbage may be filled into the basket without necessarily removing the basket. If it is desired to remove the basket, it may be slid out through the opening 60. The door 61 closes the opening 60 and is pivoted at 62 like an ordinary gas range oven door so that when dropped it will sustain itself in a horizontal position and support the basket on it. The door 63 at the bottom is pivoted at 64 in the same way and closes the opening 65 through which the ash pan 66 may be withdrawn. The door 63 has openings 67 therein, the size of which may be regulated to vary the air admitted therethrough. Air may also be admitted to the casing through the pipes 68 which are located at the bottom of the passageways 57 on each side of the casing. The ends of the pipes extend out through the front of the casing and the admission of air thereto is regulated by shutters 69. The air from the pipes 68 passes up the passageways 57 and through the outlets 70 thereof over the top of the basket.

Figure 2:
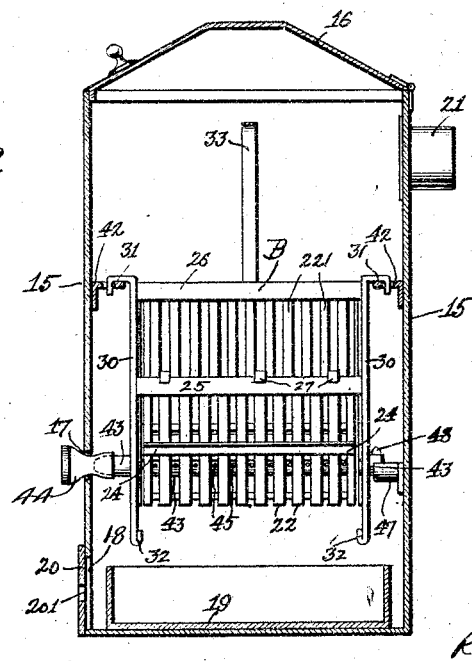
Fig. 2 is a transverse sectional view of the same, taken on the line II—II of Fig. 1, parts being shown in elevation.

The burners 71 are in most respects similar to the burners 43 shown in Figs. 1 and 2, except that the pipes are closed at both ends and the gas or liquid fuel enters near the center thereof through the connections 72 which are connected to pipes 73 extending through the front of the casing and provided with the usual regulating valves. Suitable deflectors 74 guide the ashes into the ash tray 66.

From the foregoing description it will be seen that I have provided an extremely simple and efficient household incinerator which has many advantages over complicated expensive incinerators now on the market. The parts of the incinerator are few in number, portable, designed to give long service and arranged so they may be readily and cheaply repaired or replaced when necessary.

Garbage refuse as it accumulates from the table, or otherwise, may be placed in the scrap basket receptacle which may be set in the sink or any point convenient for filling. When the receptacle is filled and the juices have somewhat drained off, the hinged lid or door of the incinerator may be opened and the receptacle suspended on the supports in the incinerator casing, in an exact and proper position over the fuel burners, so that the flame from the burners may pass through the openings in the receptacle to the garbage. The lid or door is then closed, the burners are lighted and the draft is regulated. The flames from the burners shoot through the openings in the arched portions of the receptacle and the process of incineration is thus begun. In some cases, with garbage or refuse of a certain character the burners may be extinguished before incineration is complete, as the material will be sufficiently dried out to act as its own fuel. Garbage from the table is often so wet that it requires heat units other than its own for drying out or before its own heat units are available for incineration, and the present form of incinerator dries the garbage sufficiently for its incineration. It is to be understood that the basket receptacle may be used in stoves which are suitably provided with a fuel supply such as gas flames or liquid fuel burners as well as air inlets and flue connections or outlets, and that have means for properly supporting and filling the basket receptacle.

While I have shown and described the invention in detail I do not wish to be limited to the exact constructions disclosed, as various changes may be made therein without departing from the spirit of the invention.

What I claim is:

1. In an incinerator, the combination of a casing constituting a combustion chamber, a burner in the lower portion of said chamber, and a refuse-receptacle removably supported within said chamber in spaced relation to the inner walls of the latter and in proximity to the burner, the bottom of said receptacle having an inset partitioning portion into which the jets from the burner are directed, and the said casing having an opening through which the receptacle may be bodily inserted into or removed from the combustion chamber, as desired.

2. In an incinerator, the combination of a casing constituting a combustion chamber, a burner in the lower portion of said chamber, and a skeleton-like refuse-receptacle removably supported within said chamber in spaced relation to the inner walls of the latter and in proximity to the burner, the bottom of said receptacle having an inset partitioning portion into which the jets from the burner are directed, and the said casing having an opening through which the receptacle may be bodily inserted into or removed from the combustion chamber, as desired.

3. In an incinerator, the combination of a casing constituting a combustion chamber, a burner in the lower portion of said chamber, and a refuse receptacle removably supported within said chamber in spaced relation to the inner walls of the latter and in proximity to the burner, the bottom of said receptacle having an inset partitioning portion comprising oppositely-inclined walls which bridge the burner, and the said casing having an opening through which the receptacle may be bodily inserted into or removed from the combustion chamber, as desired.

4. In an incinerator, the combination of a casing constituting a combustion chamber, a burner in the lower portion of said chamber, and a skeleton-like refuse receptacle removably supported within said chamber in spaced relation to the inner walls of the latter and in proximity to the burner, the bottom of said receptacle having an inset partitioning portion comprising oppositely-inclined walls which bridge the burner, and the said casing having an opening through which the receptacle may be bodily inserted into or removed from the combustion chamber, as desired.

5. In an incinerator, the combination of a casing constituting a combustion chamber, burners in the lower portion of said chamber, and a refuse-receptacle having its bottom portion inset to provide a series of arched members, said chamber and receptacle having coöperating means whereby the receptacle may be removably suspended within the chamber with the said members bridging the burners, and the said casing having an opening through which the receptacle may be bodily inserted into or removed from the combustion chamber, as desired.

6. In an incinerator, the combination of a casing constituting a combustion chamber, burners in the lower portion of said chamber, and a skeleton-like refuse-receptacle having its bottom portion inset to provide a series of arched members, said chamber and receptacle having coöperating means whereby the receptacle may be removably suspended within the chamber with the said members bridging the burners, and the said casing having an opening through which the receptacle may be bodily inserted into or removed from the combustion chamber, as desired.

7. In an incinerator the combination of a combined refuse receptacle and drainer, comprising a metal basket having an arched portion in the bottom thereof and openings in the arched portion of said bottom, means at the sides of said receptacle for supporting it apart from the surface on which it rests for draining purposes, and a burner in the space formed by the arched portion of the bottom.

8. A refuse receptacle for incinerators comprising a container in the form of a basket having an openwork bottom having parts thereof extending along two opposite sides of the receptacle and having a reentrant portion providing a pocket portion in the receptacle on each side of said reentrant portion, for the purpose described.

9. A refuse receptacle for incinerators comprising a container in the form of a basket having openings in the bottom and sides thereof, said bottom having a transversely extending arch therein forming pockets in said receptacle on opposite sides of said arch, and carrying and supporting means for said basket.

10. A combined refuse receptacle and strainer comprising a metal basket having a reëntrant portion in the bottom and made of longitudinally extending strips of metal bent intermediate their ends, vertically extending strips and strips extending around the basket and spot welded to the vertically and longitudinally extending strips.

11. A combined refuse receptacle and strainer comprising a metal basket having an inverted V-shaped arch in the bottom, said bottom being formed of longitudinally extending spaced strips of metal having V-shaped bends forming said arch, a cross strip extending across the top of said arch and secured to the longitudinal strips, vertical strips forming the sides of said basket, the vertical strips opposite the ends of the top of said arch being bent inwardly beneath the top of the arch to strengthen it.

12. In an incinerator, a removable refuse supporting grate having a transverse bend intermediate its ends providing a refuse receiving pocket exposed on opposite sides, said bend also serving to permit free longitudinal expansion of said grate.

13. A refuse receptacle for incinerators comprising a metal body provided with openwork sides and ends, and a grate-bottom comprising a series of spaced metal strips secured together and each of said strips having a plurality of V-shaped bends intermediate their ends and arranged to correspond with those of the adjacent strips, and means whereby said grate-bottom is detachably connected to said body.

In testimony whereof I affix my signature.

ROSSITER S. SCOTT.